US011351505B2

(12) United States Patent
Sajid et al.

(10) Patent No.: US 11,351,505 B2
(45) Date of Patent: Jun. 7, 2022

(54) FIBER-KNOTTED POROUS MEMBRANE BAG FOR THE REMOVAL OF ENVIRONMENTAL POLLUTANTS FROM WATER

(71) Applicant: King Fahd University of Petroleum and Minerals, Dhahran (SA)

(72) Inventors: Muhammad Sajid, Dhahran (SA); Ihsanullah, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 16/195,928

(22) Filed: Nov. 20, 2018

(65) Prior Publication Data
US 2020/0156010 A1     May 21, 2020

(51) Int. Cl.
*B01D 65/00*     (2006.01)
*B01D 67/00*     (2006.01)
(Continued)

(52) U.S. Cl.
CPC ....... *B01D 65/003* (2013.01); *B01D 67/0079* (2013.01); *B01D 71/021* (2013.01);
(Continued)

(58) Field of Classification Search
CPC .............. B01D 65/003; B01D 67/0079; B01D 71/021; B01D 2311/20; B01D 2311/2626; B01D 2325/02; B01D 2325/04; B01D 2325/12; B01D 63/087; B01D 69/148; B01D 63/06; B01D 67/0086; B01D 69/04; B01D 69/043; B01D 2221/08; B01D 2221/12; B01D 2257/7027; B01D 2257/93; B01D 2313/04; B01D 2313/06; B01D 2313/20; B01D 2313/40; B01D 2319/04; B01D 2325/028; C02F 1/281; C02F 2101/327; C02F 1/283; C02F 2305/08; C02F 1/28; C02F 2101/32; B01J 20/20;
(Continued)

(56) References Cited

U.S. PATENT DOCUMENTS 6,527,954 B1 *   3/2003   Furuhashi .............. B01D 39/16
                                                                                                                         210/315
9,075,037 B2     7/2015   Basheer et al.
(Continued)

FOREIGN PATENT DOCUMENTS

WO        2014/104492 A1     7/2014

OTHER PUBLICATIONS

Basheer, et al.; Development and Application of Porous Membrane-Protected Carbon Nanotube Micro-Solid-Phase Extraction Combined with Gas Chromatography/Mass Spectrometry; Analytic Chemistry 78 (8); pp. 2853-2858; Mar. 14, 2006; Abstract; 1 page.
(Continued)

*Primary Examiner* — Joseph W Drodge
(74) *Attorney, Agent, or Firm* — Oblon, McClelland, Maier & Neustadt, L.L.P.

(57) ABSTRACT

A device for easy and rapid removal of pollutants from drinking water and other liquids. A method for removing a pollutant from a drink by immersing the device into the drink. A method for constructing the device using polypropylene (PP) membrane sheet and an adsorbent.

8 Claims, 5 Drawing Sheets

(51) Int. Cl.
  *B01D 71/02* (2006.01)
  *B01J 20/20* (2006.01)
  *C02F 1/28* (2006.01)
  *C02F 101/32* (2006.01)

(52) U.S. Cl.
  CPC ............. *B01J 20/205* (2013.01); *C02F 1/281* (2013.01); *B01D 2311/20* (2013.01); *B01D 2311/2626* (2013.01); *B01D 2325/02* (2013.01); *B01D 2325/04* (2013.01); *B01D 2325/12* (2013.01); *C02F 2101/327* (2013.01)

(58) Field of Classification Search
  CPC ...... B01J 20/205; B01J 20/2805; B01J 20/30; B01J 20/3092; B01J 2220/42; B01L 3/502707; B01L 3/505; B01L 2300/12; B01L 2300/123; B65D 29/00; B65D 29/02; B65D 29/04; B65D 33/06; B65D 33/12; B65D 33/16; B65D 33/165; B65D 33/26; B65D 33/28; B65D 37/00; G01N 1/40; G01N 1/4005; G01N 1/405; G01N 33/1826; G01N 33/1833
  USPC .................. 383/25, 30, 85, 88, 89, 105, 117
  See application file for complete search history.

(56) References Cited

U.S. PATENT DOCUMENTS

| | | |
|---|---|---|
| 2012/0325735 A1 | 12/2012 | Dicks et al. |
| 2013/0130270 A1* | 5/2013 | Rajapogal ........ G01N 33/56911 435/6.15 |
| 2013/0344488 A1* | 12/2013 | Mach ..................... B01J 20/267 435/6.12 |
| 2014/0209539 A1* | 7/2014 | El Badawi ........... B01D 69/148 210/651 |
| 2015/0096935 A1* | 4/2015 | Mitra ................. B01D 67/0088 210/500.23 |
| 2015/0321168 A1* | 11/2015 | Na ............................ C02F 1/70 428/323 |
| 2017/0021310 A1* | 1/2017 | Berzinis ................. B01D 61/14 |
| 2017/0052191 A1* | 2/2017 | Basheer ................. G01N 30/06 |
| 2018/0354815 A1* | 12/2018 | Poler ........................ B01J 39/26 |
| 2020/0180978 A1* | 6/2020 | Awadh ................... C08J 3/2053 |
| 2020/0225131 A1* | 7/2020 | Sajid ..................... B01D 11/028 |

OTHER PUBLICATIONS

Guo, et al ; Development of multiwalled carbon nanotubes based micro-solid-phase extraction for the determination of trace levels of sixteen polycyclic aromatic hydrocarbons in environmental water samples ; Journal of Chromatography A ; vol. 1218 Issue 52 ; pp. 9321-9327 ; Dec. 30, 2011 ; Abstract ; 7 pages.

Tan, et al ; Evaluation of a novel microextraction technique for aqueous samples: Porous membrane envelope filled with multiwalled carbon nanotubes coated with molecularly imprinted polymer ; Journal of Separation Science 34 ; pp. 707-715 ; Feb. 11, 2011 ; 9 pages.

Yang, et al ; Adsorption of Polycyclic Aromatic Hydrocarbons by Carbon Nanomaterials ; Environmental Science & Technology 40 (6) ; pp. 1855-1861 ; Feb. 16, 2006 ; Abstract ; 1 page.

Schwartz ; Stellenbosch-U scientists patent tea-bag-like water filter ; Tech transfer eNews Blog ; Aug. 25, 2010 ; Abstract ; 2 pages.

Basheer, et al ; Development and Application of Porous Membrane-Protected Carbon Nanotube Micro-Solid-Phase Extraction Combined with Gas Chromatography/Mass Spectrometry ; Analytic Chemistry 78 (8) ; pp. 2853-2858 ; Apr. 15, 2006 ; 6 pages.

Ge, et al. ; Water stability of zeolite imidazolate framework 8 and application to porous membrane-protected micro-solid-phase extraction of polycyclic aromatic hydrocarbons from environmental water samples ; Journal of Chromatography A 1218 ; pp. 8490-8495 ; Oct. 6, 2011 ; 6 pages.

Sajid, et al ; Porous membrane protected micro-solid-phase extraction: A review of features, advancements and applications ; Analytic Chimica Acta 965 ; pp. 36-53 ; Mar. 1, 2017 ; 18 pages.

* cited by examiner

FIBER-KNOTTED POROUS MEMBRANE BAG FOR THE REMOVAL OF ENVIRONMENTAL POLLUTANTS FROM WATER

BACKGROUND OF THE INVENTION

Field of the Invention

The invention pertains to production and purification of potable water and other consumable liquids by removal of pollutants and contaminants such as polyaromatic hydrocarbons.

Description of Related Art

Water contamination with inorganic and organic pollutants due to increasing anthropogenic activities is a global challenge; X. Qu, P. J. J. Alvarez, Q. Li, *Applications of nanotechnology in water and wastewater treatment*, Water Res. 47 (2013) 3931-3946. doi:10.1016/j.watres.2012.09.058; I. Ali, V. K. Gupta, *Advances in water treatment by adsorption technology*, Nat. Protoc. 1 (2007) 2661-2667. http://_dx.doi.org/10.1038/nprot.2006.370; V. K. Gupta, I. Ali, T. A. Saleh, A. Nayak, S. Agarwal, *Chemical treatment technologies for waste-water recycling-an overview*, RSC Adv. 2 (2012) 6380-6388. doi:10.1039/C2RA20340E. The presence of such pollutants in water poses serious toxic effects to human health and wildlife. An adequate supply of safe drinking water is one of the main prerequisites for maintaining a healthy life on the earth.

Polyaromatic hydrocarbons (PAHs) are usually produced during incomplete combustion of organic matter; H. I. Abdel-Shafy, M. S. M. Mansour, *A review on polycyclic aromatic hydrocarbons: Source, environmental impact, effect on human health and remediation*, Egypt. J. Pet. 25 (2016) 107-123; doi:10.1016/j.ejpe.2015.03.011. These compounds have been placed in a class of priority pollutants by the United States Environmental Protection Agency (US EPA) because of their potential carcinogenic and mutagenic effects; C. Siritham, C. Thammakhet-Buranachai, P. Thavarungkul, P. Kanatharana, *A preconcentrator-separator two-in-one online system for polycyclic aromatic hydrocarbons analysis*, Talanta. 167 (2017) 573-582. doi:https://doi.org/10.1016/j.talanta.2017.02.035. PAHs can induce health related issues even at extremely low-level concentrations. It is therefore necessary to significantly reduce or remove even their traces to maintain the quality of drinking water. Fluorene and anthracene are among sixteen priority pollutants of this class of pollutants.

A number of strategies and efforts have been made to remove toxic environmental pollutants from the water; M. Sajid, M. K. Nazal, Ihsanullah, N. Baig, A. M. Osman, *Removal of heavy metals and organic pollutants from water using dendritic polymers based adsorbents: A critical review*, Sep. Purif. Technol. 191 (2018). doi:10.1016/j.seppur.2017.09.011; Ihsanullah, A. Abbas, A. M. Al-amer, T. Laoui, M. J. Al-marri, M. S. Nasser, M. Khraisheh, M. Ali, *Heavy metal removal from aqueous solution by advanced carbon nanotubes: Critical review of adsorption applications*, Sep. Purif. Technol. 157 (2016) 141-161. doi:10.1016/j.seppur.2015.11.039; Ihsanullah, A. M. Al Amer, T. Laoui, A. Abbas, N. Al-Aqeeli, F. Patel, M. Khraisheh, M. A. Atieh, N. Hilal, *Fabrication and antifouling behaviour of a carbon nanotube membrane*, Mater. Des. (2016). doi:10.1016/j.matdes.2015.10.018; X. Yang, H. Cai, M. Bao, J. Yu, J. Lu, Y. Li, *Insight into the highly efficient degradation of PAHs in water over graphene oxide/$Ag_3PO_4$ composites under visible light irradiation*, Chem. Eng. J. 334 (2018) 355-376. doi:https://doi.org/10.1016/j.cej.0.2017.09.104.

Adsorption is one of the well-known strategies for water treatment; H. A. Asmaly, B. Abussaud, Ihsanullah, T. A. Saleh, A. Alaadin, T. Laoui, A. M. Shemsi, V. K. Gupta, M. A. Atieh, H. A. Asmaly, B. Abussaud, T. A. Saleh, A. Alaadin, *Evaluation of micro- and nano-carbon-based adsorbents for the removal of phenol from aqueous solutions*, Toxicol. Environ. Chem. 97 (2015) 1164-1179. doi: 10.1080/02772248.2015.1092543; Ihsanullah, F. A. Al-Khaldi, B. Abusharkh, M. Khaled, M. A. Atieh, M. S. Nasser, T. Laoui, T. A. Saleh, S. Agarwal, I. Tyagi, V. K. Gupta, *Adsorptive removal of cadmium(II) ions from liquid phase using acid modified carbon-based adsorbents*, J. Mol. Liq. 204 (2015) 255-263. doi:10.1016/j.molliq.2015.01.033; V. K. Gupta, Suhas, Application of low-cost adsorbents for dye removal—A review, J. Environ. Manage. 90 (2009) 2313-2342. doi:https://doi.org/10.1016/j.jenvman.2008.11.017.

Adsorption technologies that allow in situ water treatment in areas of water scarcity are highly desirable. The major difficulties that arise with existing technologies include the logistics and proper handling of the adsorbents and management of the adsorption process which can require special operational materials or conditions such as special chambers, flow setups, pressure and temperature monitors, and transportation of the whole system. In other words, although efficient adsorption technologies exist but most of them are not cheap, not simple, not portable, or not usable by consumers or end users in the remote areas.

Porous membrane protected adsorbents (µ-SPE device) have been extensively used for the analytical extraction of the pollutants from different matrices; C. Basheer, A. A. Alnedhary, B. S. M. Rao, S. Valliyaveettil, H. K. Lee, *Development and application of porous membrane protected carbon nanotube micro-solid-phase extraction combined with gas chromatography/mass spectrometry*, Anal. Chem. 78 (2006) 2853-8. doi:10.1021/ac060240i; L. Guo, H. K. Lee, *Development of multiwalled carbon nanotubes based micro-solid-phase extraction for the determination of trace levels of sixteen polycyclic aromatic hydrocarbons in environmental water samples*, J. Chromatogr. A. 1218 (2011) 9321-7. doi:10.1016/j.chroma.2011.10.066; M. Sajid, *Porous membrane protected micro-solid-phase extraction: A review of features, advancements and applications*, Anal. Chim. Acta. 965 (2017) 36-53. doi:10.1016/j.aca.2017.02.023. However, such devices have never been employed for the effective and efficient removal of the pollutants. The analytical extraction of pollutants is quantitatively and qualitatively different from removal of pollutants from a liquid such as drinking water to significantly reduce or eliminate contaminants. In the former, the target compounds are extracted in analytical quantities onto a sorbent packed inside a membrane and then desorbed into a suitable solvent for analysis. The purpose is to quantify the amount of pollutants present in different matrices. In the later process, which involves removal of pollutants to reduce toxicity, the target pollutants are removed from the water or any other samples by their adsorption onto the sorbent packed inside the membrane. This later process is not related to quantification of target compounds but to their complete removal from the water for treatment purposes.

In view of the problems with and limitations of prior techniques and devices for removing pollutants from water the inventors sought to develop a technology that is portable, efficient, simple to operate, and cost effective. As described herein the inventors designed, developed and tested an adsorption device, system and method for the removal of pollutants from water based on a fiber-knotted porous membrane bag.

SUMMARY OF THE INVENTION

In one embodiment of this technology the inventors designed a device for easy and rapid removal of pollutants from drinking water and other liquids. The device was constructed using polypropylene (PP) membrane sheet and an adsorbent. The PP sheet was heat-sealed to fabricate a small bag with one open end. The adsorbent was packed inside the bag and open end was heat-sealed. This bag was knotted with a cloth fiber from the upper edge and can be used for adsorption of pollutants from water. This device is low-cost, easy to fabricate, portable, simple to operate, and can be easily handled by the end user without any special technical requirements. It does not need to separate the adsorbent from the bound pollutant after the adsorption and thus it is feasible to package the adsorbent in sealed bag or other enclosure which can be disposed of after use. It does not require any kind of filtration or centrifugation for the collection of the adsorbent. It provides flexibility to pack any kind of adsorbent depending on the nature of the target pollutants in the water. For example, carbon-based adsorbents can be used to capture a variety of pollutants include PAHs, organochlorine pesticides and polychlorinated biphenyls and other pollutants. As shown herein, a sealed enclosure (bag) of the invention removes representative PAH pollutants from water using multiwall carbon nanotubes (MWCNTs) or a mixture of MWCNTs and graphene as an adsorbent.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE INVENTION

Figure 1:
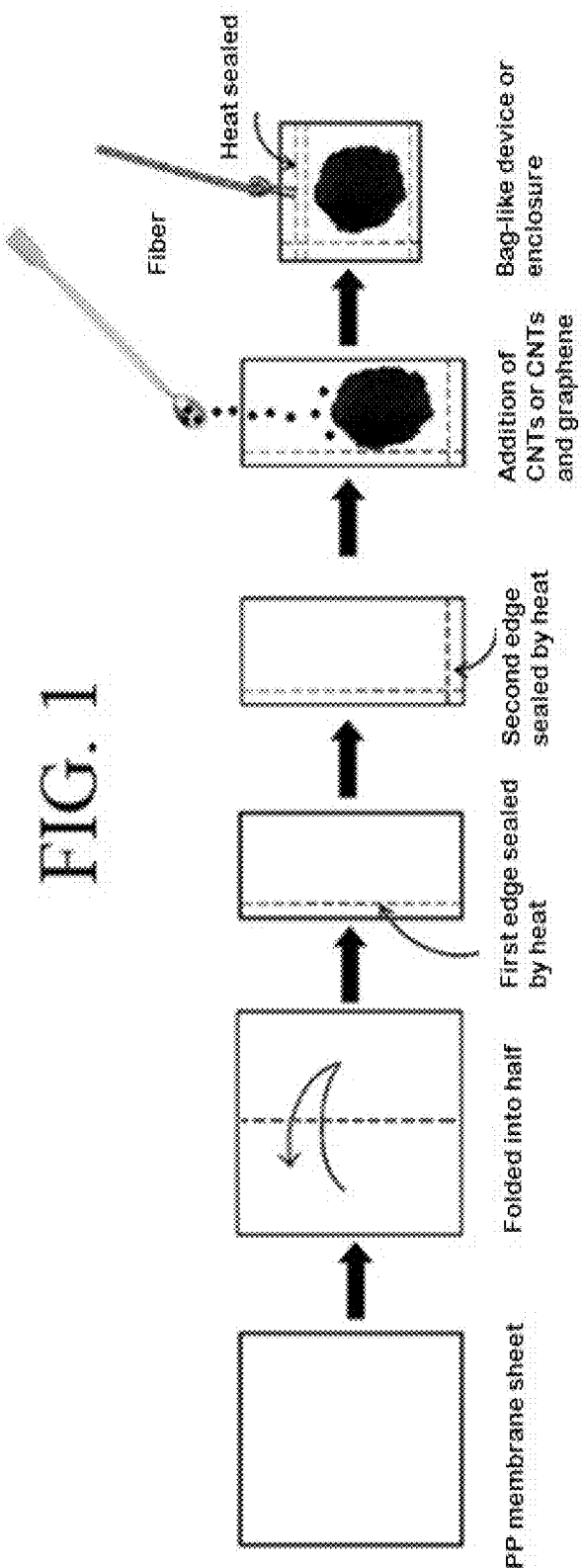
FIG. 1. Schematic of the preparation of fiber-knotted porous membrane bag.

Adsorbents that may be used in the invention include carbon nanotubes (https://_en.wikipedia.org/wiki/Carbon-_nanotube), granular carbon, graphene layered double hydroxide (https://www.sciencedirect.com/science/article/pii/S0008622316302445), carbon clusters, (https://_aip.sci-tation.org/doi/10.1063/1.2838200), ion-exchange resins, C-18 adsorbents (https://_www.reference.com/science/c18-column-ab41a1705612e362), and mixtures thereof. Further descriptions of these adsorbents are incorporated by reference to the links shown above (last accessed Sep. 4, 2018).

When carbon nanotubes are used as an adsorbent they may range in external diameter from 1, 2, 3, 4, 5, 6, 7, 8, 9, 10, 11, 12, 13, 14, 15, 16, 17, 18, 19, 20 or >20 nm; and in length from 0.5, 1.0, 2, 3, 4, 5, 6, 7, 8, 9, 10 or >10 µm. In some embodiments exemplified herein carbon nanotubes are used that have an outside diameter of 10-20 nm and a length of 1-10 µm. In some embodiments multiwalled carbon nanotubes are used as adsorbents and have an external diameter less than 15, 20 or 25 nm and a length greater than 1, 2, 3, 4, or 5 µm. While further treatments of an adsorbent may be made, preferably, it is not necessary to treat the carbon nanotubes or MWCNTs with additional films or coatings, such as an imprinted polymer, and the nanotubes may be used without any additional film or coating such as thin film of biocides encapsulated in nanofibers. In other embodiments mixtures of different adsorbents, such as a mixture of carbon nanotubes and graphene, may be used. In some embodiments, the carbon nanotubes will be multiwalled carbon nanotubes, in other embodiments they are not multiwalled.

The invention includes a membrane that prevents release of adsorbents such as carbon nanotubes into a liquid being treated while permitting perfusion of the liquid containing the contaminants to be removed into a compartment holding the adsorbent. Advantageously, the bag or other enclosure may comprise, consist essentially of, or consist of fiber-knotted polypropylene though other synthetic membranes with similar thickness and porosity may be used. A fiber knot describes a knot in a fiber string that holds the bag or other enclosure from its upper edge. Polypropylene may be a homopolymer or a copolymer, such as a block copolymer or random copolymer. Conveniently, a commercially available polypropylene may be used.

Advantageously the membrane thickness can range from 50, 60, 70, 80, 90, 100, 110, 120, 130, 140, 150, 160, 170, 180, 190, 200 or >200 µm, preferably about 100 µm and/or the pore size of the membrane can range from 0.05, 0.06, 0.07, 0.08, 0.09, 0.10, 0.11, 0.12, 0.13, 0.14, 0.15, 0.16, 0.17, 0.18, 0.19, 0.20, 0.21, 0.22, 0.23, 0.24 or 0.25 µm, preferably about 0.1 to 0.2 µm. In some embodiments, the pore size in the membrane will be greater than or equal to 0.05, 0.06, 0.07, 0.08, 0.09 or 0.10 µm and the membrane thickness will not exceed 100 µm.

Preferably, the membrane itself will be a single layer and will not incorporate an adsorbent within its structure, such as a polymeric matrix containing carbon nanotubes as one ingredient. It is not necessary for the membrane to contain a second layer such as a backing or support layer or a film or applied coating. Such a membrane when configured as an enclosure for an adsorbent will typically contain a loose or packed adsorbent that is separate and not attached to the membrane. However, in some alternative embodiments, an adsorbent may be bound to or coated on the membrane.

In one embodiment, the membrane forming a bag or sealed enclosure will have a uniform thickness of about 100 µm and a pore size of about 1.0 µm. In some embodiments, a polypropylene bag may be replaced by a porous bag made of a different kind of food-grade plastic or by a porous paper bag, such as one made of filter paper that can prevent the release of adsorbent into a liquid to be treated. Preferably the membrane has a uniform thickness and pore size that does not vary by more than 0.1, 0.2, 0.5, 1, 2, 3, 4, 5, 6, 7, 8, 9, or 10% over a membrane surface exposed to a contaminated liquid. Unlike conventional membranes which do not have uniform thickness or porosity, the use of a membrane with uniform properties provides a more reliable removal of pollutants from drinking water or other treated liquids.

An enclosure or bag for adsorbent comprises the membrane and is configured as a triangular, tetrahedral, square, cubic, rectangular, parallelepiped, circular, spherical, pouch-like, sachet-like, purse-like, or other shape that prevents release of the adsorbent into the liquid being treated. In some embodiments, two or more membranes are sealed together to produce the sealed enclosure of the invention, for example, two rectangular or square-shaped membranes may have adsorbent loaded between their surfaces and then sealed to produce a sealed enclosure or two circular or oval-shaped membranes may be loaded with adsorbent and sealed to product a circular or oval pod. In other embodiments, only a single membrane will be used to produce a sealed enclosure for adsorbent. Typically the enclosure or bag permanently seals in the adsorbent so as to prevent its accidental removal and to prevent its removal after binding to a pollutant.

In some embodiments, the enclosure contains pleats or folds that permit it to open or expand after contact with a liquid thus exposing more of the membrane surface to the liquid to be treated. An enclosure will typically contain a seal and a string, thread, or grip to permit it to be dropped into a liquid and then removed. The seal may be a string that secures the contents of the enclosure at one end by a knot, such as a fiber knot to help shape the bag, or other attachment where the appendage is long enough to permit dipping, swirling, lifting, or other movement of the enclosure in a liquid being treated and for removal of the enclosure once it has be used. A top or distal end of the string, thread or grip, may be attached to a tab which may be colored coded or labelled to permit easy handling and identification of the enclosure and its contents. The string, thread or grip is typically about 4, 5, 6, 7, 8, 9, 10, 11, or 12 cm long, but may be longer or shorter depending on the shape of the container holding a liquid to be treated. The string, thread or grip may be made of cotton or another natural fiber, a synthetic fiber such as nylon, or a blend of natural and synthetic fibers which, preferably, are woven.

In some embodiments, the membrane will be formed into an enclosure by a fiber knot or by a drawstring that is knotted to bring the edges of the membrane together or form it into a bag shape and seal them. The bag or enclosure need not be sealed with an adhesive or heat or mechanically, such as with a stitching or stapling. In other embodiments, all or part of the enclosure may be heat sealed, and then, preferably secured by a fiber knot to a string or other grip that permits insertion, manual movement of the bag in a treated liquid, and its subsequent removal. In still other embodiments, the edges or perimeter of the membrane may be sealed with an adhesive or folded and mechanically sealed, for example with stitching or stapling.

The enclosure of the invention is preferable sized so as to fit into a drinking receptacle for water or other liquids, such as a coffee cup, tea cup, or glass. For example, it may measure 1, 2, 3, 4, 5, 6, or 7 cm when measured across its widest dimension or diameter. In other embodiments, it may be larger so as to fit into a pitcher, teapot, coffee pot, canteen, or other receptacle for liquids, for example at least 6, 7, 8, 9, or 10 cm across its widest linear dimension. In some embodiments, a sealed enclosure will have a square or rectangular profile with sides no more than 6 cm long or one that is oval, round or pod-shaped and has a major diameter that is no more than 6 cm in length. In other embodiments, a sealed enclosure will have a square or rectangular profile with sides no more than 2 cm long or that is oval, round or pod-shaped and has a major diameter that is no more than 2 cm in length.

However, larger or smaller enclosures may be designed to fit within a particular kind of container holding a liquid to be treated. In some embodiments, the enclosure of the invention may be packaged along with a disposable paper or plastic cup or glass or may be sized to fit within a larger porous paper or plastic enclosure holding at least one infusible material, such as into a porous filter paper bag holding tea leaves or ground coffee.

The enclosure is typically is formed by a single layer of the membrane without additional membranous layers, coatings, films, filtration assemblies, holders, or other external components as a single layer of membrane provides for more rapid and complete perfusion of the liquid into the enclosure. Thus, for use, it is unnecessary to insert it into a frame, carrier, filter cartridge assembly, or other mechanical device to affix a filter. However, in some alternative embodiments, two, three or more layers of membrane or may be used to form an enclosure or the enclosure itself may be incorporated as part of a larger system containing other elements such as filters, holders or other external components. However, it is not necessary to include other substrates, materials, or elements required for analytic extraction of pollutants or to configure the enclosure for a tight fit within a filter unit or bottleneck. However, in some embodiments the bag of the invention may be packaged in a box, package, or in individual packaging material that can be torn open prior to use of the bag or enclosure that it contains.

The enclosure or bag according to the invention may contain sufficient adsorbent to substantially reduce the amount of a contaminant or pollutant in the liquid to be treated, for example, in 100, 200, 500 or 1,000 ml of drinking water. For example, it may contain about 0.25, 0.5, 0.75, 1.0, 1.25, 1.5, 1.75, 2.0, 2.25, 2.5, 2.75, 3.0 or >3.0 mg of adsorbent such as MWCNT or contain these amounts of adsorbents per 100 mL of treated liquid. In some embodiments, a sealed enclosure will contain about 1, 2, 5, 10, 20, 30, 40, or 50 of the adsorbent per 100 $cm^2$ of membrane. In other embodiments, a sealed enclosure will contain about 10, 15, 20, 25, 30, 35 or 40 mg of the adsorbent per 100 $cm^2$ of membrane. In still other embodiments, an enclosure may contain about 25 mg of the adsorbent per 100 $cm^2$ of membrane.

An enclosure may contain sufficient adsorbent to reduce the amount of target pollutant in the water or treated liquid by 10, 20, 30, 40, 50, 60, 70, 80, or 90% and is useful for treating water containing trace amounts of pollutants such as PAHs. An enclosure of the invention may be used to treat liquids containing concentrations of a pollutant up to 100, 200, 300, 400, 500, 600, 700, 800, 900 or 1,000 µg/L of one or more pollutants. However, from the perspective of removal efficiency and/or removal speed, an enclosure will be preferably used to remove one or more trace pollutants at a concentration not exceeding 5, 10, 25, 50, 60, 70, 80, 90 or 100 µg/L.

In some embodiments, the bag or enclosure of the invention containing an adsorbent may be accompanied by other substances that can be dissolved and released into drinking water or another consumable liquid. For example, it may contain and retain ground coffee or tea leaves or contains flavorings, sugars, salts or vitamins. These may be contained in the same compartment as the adsorbent, in a separate enclosure, or in a separate bag next to or concentric with the enclosure containing adsorbent. The adsorbent will remove pollutants and contaminants and the accompanying materials may brew or provide a consumable beverage along with the purified liquid material. PAHs can cause a number of undesirable physiological effects. Thus, accompanying materials or compounds can include those that inhibit binding of a PAH to DNA, reduce or quench the formation of active oxygen species, or reduce cell-mediated inflammation caused by ingestion of a PAH. These include antioxidant compounds such as vitamin A, carotenes, vitamin C, vitamin E, cysteine, acetylcysteine, lipoic acid, ubiquinol (CoQ10), propyl gallate, BHT, BHA, TBHQ, and materials containing polyphenols or natural phenols. In some embodiments physiological nontoxic amounts of a soluble preservative, bacteriostatic agent, or biocide, such as citric acid, tartaric acid, EDTA, sorbic acid, sorbates, benzoic acid, benzoates, sulfites, propionic acid, propionates, etc. may be incorporated into the adsorbent or into the bag or enclosure.

Pollutants or contaminants that can be removed from drinking water or other liquids include polyaromatic hydrocarbons (PAHs) such as fluorene and anthracene, polycyclic aromatic hydrocarbons, organochlorine pesticides, and polychlorinated biphenyls as well as other undesirable substances that bind to the adsorbent. It is not necessary for the bag or enclosure of the invention to remove or quantify other kinds of chemicals not typically found in drinking water to be treated or found at insignificant concentrations such as organophosphorous pesticide residues or other chemicals often subject to analytic extraction. Moreover, it is unnecessary to desorb pollutants from the adsorbents contained in the bag according to the invention. Once used to remove contaminants from a beverage the bag along with the spent adsorbent may simply be discarded.

Fluorene or 9H-fluorene, is a polycyclic aromatic hydrocarbon. Like most PAHs, fluorene is used to make dyes, plastics and pesticides. If one eats or drinks food or water that is contaminated with PAHs, one could be exposed. Once in the body, a PAH can spread and target fat tissues. Target organs include kidneys, liver and fat. PAHs once ingested leave the body through urine and feces. The invention provides a simple and effective way to avoid exposure to fluorene and other PAHs.

Anthracene is a solid polycyclic aromatic hydrocarbon of formula $C_{14}H_{10}$, consisting of three fused benzene rings. Other PAHs include those that are probably human carcinogens such as benz(a)anthracene, benzo(a)pyrene, benzo(b) fluoranthene, benzo(k)fluoranthene, chrysene, dibenz(a,h) anthracene, and indeno(1,2,3-c,d)pyrene.

The device of the invention may be employed to reduce the levels of one or more PAHs or other pollutants and contaminants by at least 5, 10, 15, 20, 25, 30, 35, 40, 45, 50, 55, 60, 65, 70, 75, 80, 85, 90 or 95% in drinking water or other treated liquid.

Drinking water also known as potable water is water that is safe to drink or to use for food preparation. The amount of drinking water needed for an individual depends on physical activity, age, health issues, and environmental conditions. Americans, on average, drink one liter of water a day and 95% drink less than three liters per day. For those who work in a hot climate, up to 16 liters a day may be required. Typically in developed countries, tap water meets drinking water quality standards, even though only a small proportion is actually consumed or used in food preparation. Globally, by 2015, 89% of people had access to water from a source that is suitable for drinking—called improved water source. However, in Sub-Saharan Africa, access to potable water ranged from 40% to 80% of the population. Nearly 4.2 billion people worldwide had access to tap water, while another 2.4 billion had access to wells or public taps. The World Health Organization considers access to safe drinking-water a basic human right. About 1 to 2 billion people lack safe drinking water. Sources of water include both improved and unimproved sources. Improved sources include piped water into dwelling, piped water into yard/ plot, public tap/standpipes, tubewell/boreholes, protected dug wells, protected springs (normally part of a spring supply), rainwater collection and bottled water, if the secondary source used by the household for cooking and personal hygiene is improved. Water sources that are not considered as "improved" are: unprotected dug wells, unprotected springs, vendor provided water, cart with small tank/drum, bottled water, if the secondary source used by the household for cooking and personal hygiene is unimproved tanker-truck, and surface water. The invention may be used to improve the quality of water including water from improved or unimproved sources especially in urban or rural locations where reliably clean drinking water is not available.

Method of Use.

The invention provides a simple device for the removal of pollutants and contaminants, such as polyaromatic hydrocarbons, from drinking water. This process involves the removal of these pollutants and contaminants by binding to an adsorbent such as MWCNTs or graphene, and subsequent disposal of the adsorbent bound to the pollutant or contaminant. It does not require a subsequent elution or quantification of the pollutants or contaminants as would occur for analytical extraction of a chemical compound. In some modes of use, more than one, two or three bags may be added to drinking water or other beverage and different bags may contain adsorbents for different contaminants. This method may be performed by immersing or otherwise contacting the bag or sealed enclosure or bag of the invention with a liquid. Preferably the liquid is water, however, other liquids such as juices, infusions like tea, herbal teas, or coffee, vegetable milks, animal milks, or vegetable or meat broths which may be contaminated with compounds such as PAHs that bind to the adsorbent in the enclosure may also be treated. Water or the other liquid should be in a liquid state that is between their freezing and boiling points at standard pressure, for example, for many aqueous liquids at a temperature between 0, 10, 20, 30, 40, 50, 60, 70, 80, 90 and 100° C. The liquid being treated preferably has a pH ranging from about 6, 6.25, 6.5, 6.75, 7, 7.25, 7.5, 7.75 to 8. The enclosure of bag of the invention may be used by those who want to reduce the concentration of PAHs or other contaminants in drinking water or other consumable liquids or to reduce the risk of exposure to these substances. It may be especially useful for subjects who are sensitive to PAHs, such as those who are genetically or otherwise at risk of cancer, pulmonary dysfunction, or gastrointestinal, renal or dermatological dysfunction due to PAH exposure.

Examples

Chemicals and Materials.

Carbon nanotubes (CNTs) with a purity >95% were acquired from Chengdu Organic Chemicals Co. Ltd., China (Chengdu, China) with an outside diameter of 10-20 nm and a length of 1-10 μm. Graphene (96-99%, 50-100 nm) was purchased from Grafen Chemical Industries Co. and Mg—Al LDH was synthesized by the inventors. A polypropylene (PP) membrane sheet roll (Type PP 1E (R/P), pore size: 0.1

μm, wall thickness: 100 μm) was obtained from Membrana (Germany). Analytical standards of fluorene and anthracene were obtained from Sigma Aldrich. Ethanol and dichloromethane (HPLC grade) were acquired from Fisher Chemical. N-Hexane (HPLC grade) was obtained from Sigma Aldrich. A cloth fiber with a length of 8 cm was used to knot the sorbent containing porous membrane bag.

Fabrication of the Fiber-Knotted Porous Membrane Device.

A piece of the polypropylene (PP) membrane sheet was cut from the roll. After that, it was folded into half and open ends were heat sealed to construct an envelope with one open end. The adsorbent (1 mg) was poured inside the envelope from the open end, which was subsequently heat-sealed to a bag shape (2 cm×2 cm). A cloth fiber was knotted to the bag so that the bag can be easily manually immersed and taken out from the sample solution. The fabrication scheme of PP membrane fiber-knotted bag device is shown in FIG. 1.

Procedure for Removal of PAHs from Water.

Removal of PAHs from aqueous solution was performed in the batch mode. The sorbent inside the fiber-knotted porous membrane enclosure was first activated by immersing in ethanol under sonication for 5 min. This bag was then immersed in 100 mL of the aqueous solution containing a mixture of fluorene and anthracene at different concentration levels ranging from 50 to 1000 μg/L. The removal process was assisted by shaking for 1 hour. All the experiments were performed at pH 7.

Figure 2:
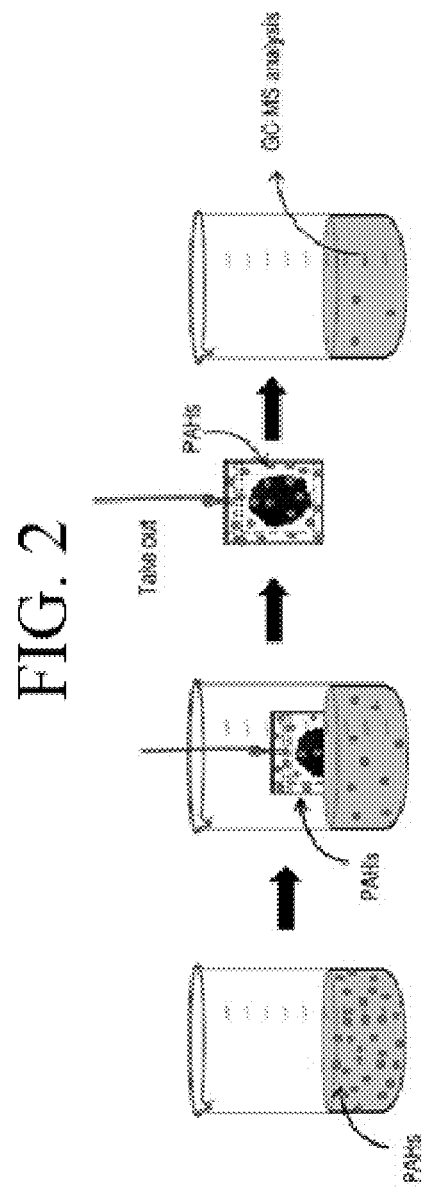
FIG. 2. Removal process of PAHs by the fiber-knotted porous membrane enclosed sorbent.

After the completion of the removal process, the membrane enclosure was removed from the aqueous solution using the knotted fiber. The remaining amounts of the fluorene and anthracene were extracted into a 10 mL mixture of n-hexane and dichloromethane by liquid-liquid extraction. The extract was further concentrated to 1 mL and analyzed by gas chromatography mass-spectrometry (GC-MS). FIG. 2 shows stepwise schematic of the removal of PAHs from water using the fiber-knotted porous membrane bag-like device.

Figure 3:
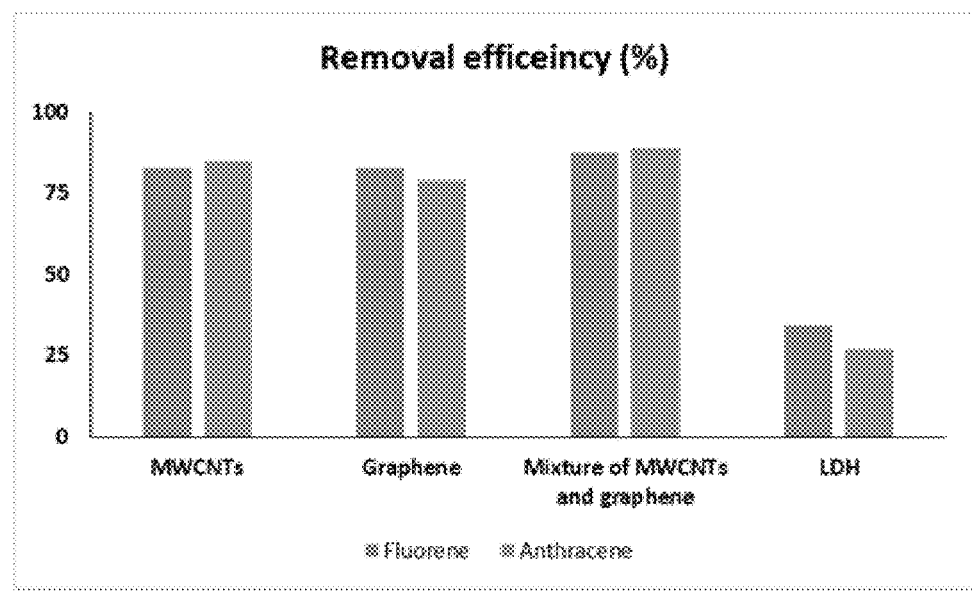
FIG. 3. Removal efficiency of the different adsorbents. First bar in each set: fluorine, second bar: anthracene.

The performance of different adsorbents such as MWCNTs, graphene, LDH, and 1:1 mixture of graphene and MWCNTs was evaluated for removal of fluorene and anthracene from water at 100 μg/L under identical conditions. The results of carbon-based adsorbents were significantly better compared to LDH. Based on the chromatographic peak areas for the remaining target pollutants in the solution, relatively higher removal efficiency was observed with the mixture of MWCNTs and graphene (FIG. 3). The different parameters were adjusted and studied using the mixture of MWCNTs and graphene.

Figure 4:
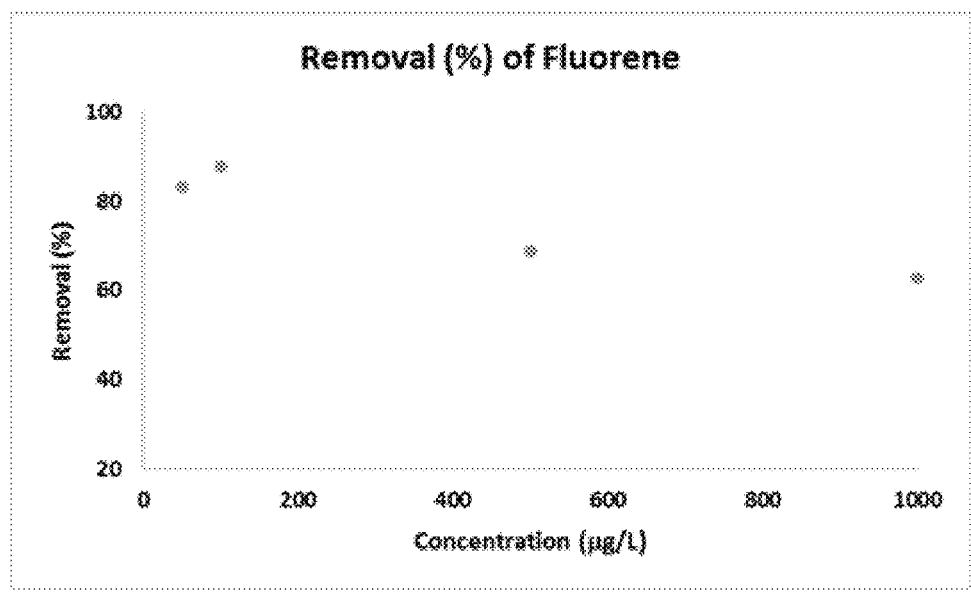
FIG. 4. Removal of fluorene versus concentration.
Figure 5:
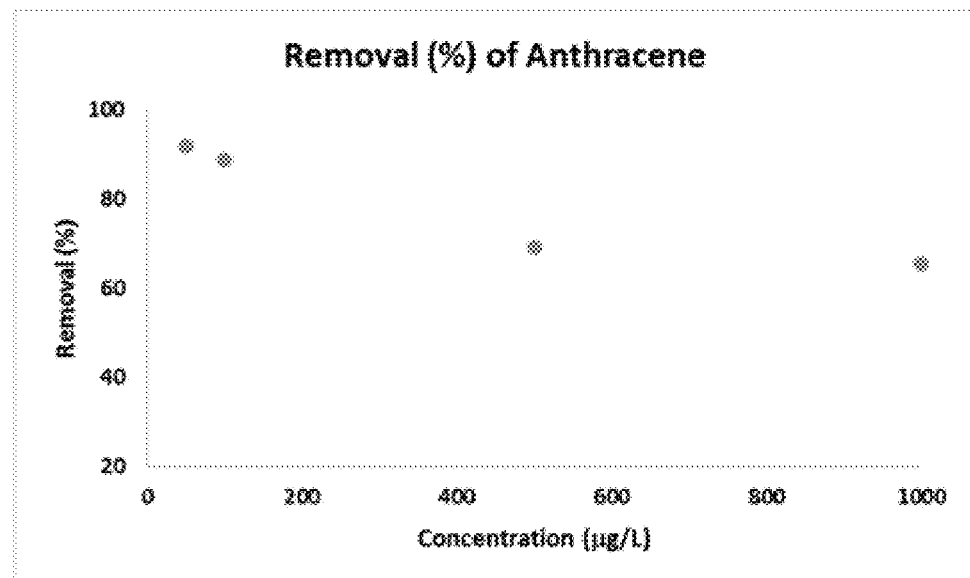
FIG. 5: Removal of anthracene versus concentration.
Figure 6:
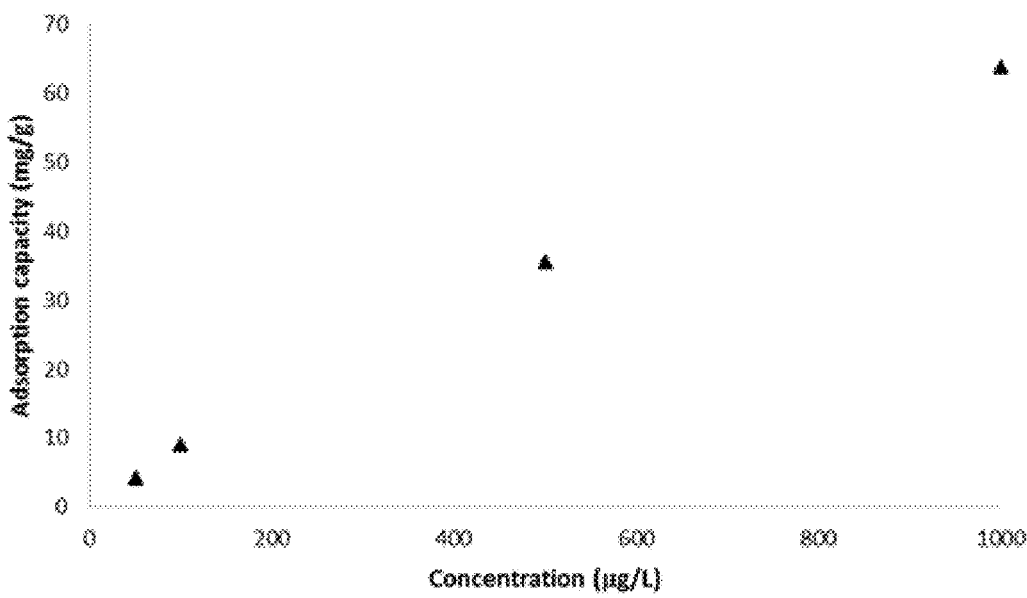
FIG. 6. Adsorption capacity versus fluorene concentration.
Figure 7:
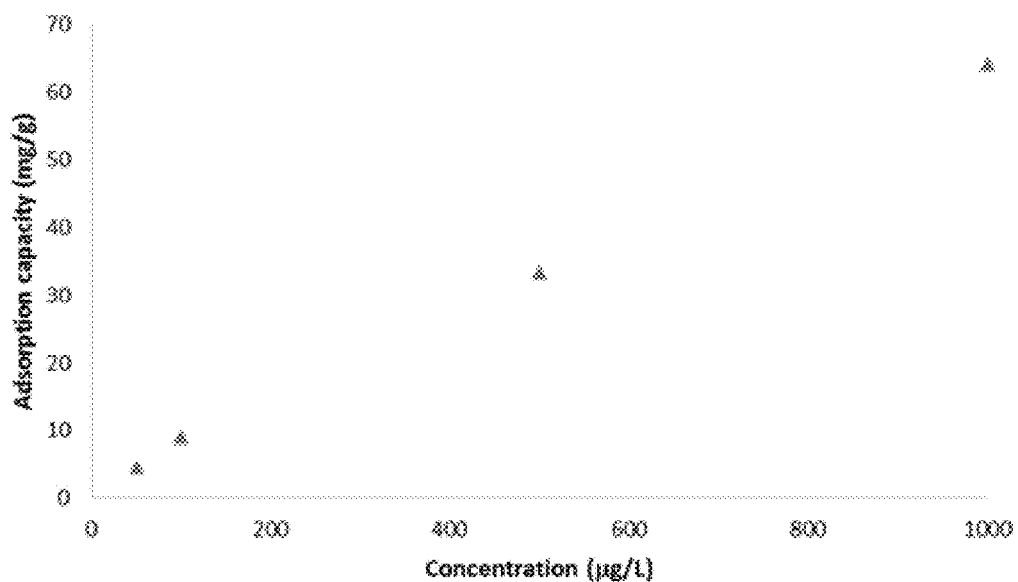
FIG. 7. Adsorption capacity versus anthracene concentration.

The effect of concentration of fluorene and anthracene on the removal performance of membrane packed mixture adsorbent is presented in FIGS. 4 and 5 respectively. Concentration of the PAHs was varied from 50 to 1000 μg/L. A maximum removal of about 90% was observed at 100 μg/L concentration both for fluorene and anthracene respectively. It was observed that the removal of fluorene increased slightly with increase in concentration from 50 to 100 μg/L. However, the removal declined with increase in concentration beyond 100 μg/L. This behavior can be explained based on the availability of limited adsorption sites on the surface of the mixed adsorbent. At low concentration, all the PAH molecules can adsorb on the surface of the adsorbent. However, at higher concentrations, the initially adsorbed molecules will occupy the adsorption sites and it will limit the access of additional molecules to active adsorbent sites. Almost a similar trend was observed for the removal of anthracene by this device.

Plots of experimental adsorption capacity vs fluorene and anthracene concentration are shown in FIG. band 7 respectively. The adsorption capacity was observed to increase with increase in the concentration of both pollutants. The experimental adsorption capacity of the adsorbent for fluorene and anthracene in mixture was 65 and 66 mg/g, respectively at 1000 μg/L. This suggested that this device is efficient in removing low concentration of PAHs, which are usually the case with real drinking water samples.

As shown by the inventor for the first time, a fiber-knotted porous membrane bag containing a mixture of MWCNTs and graphene was successfully fabricated and used for removal of fluorene and anthracene from drinking water. The device removed about 90% of both pollutants at environmentally concerned concentrations. This low-cost, easy to fabricate, and portable adsorption device can be used for removal of variety of pollutants by varying the adsorbent. It has a great potential of commercialization owing to its unique design.

Terminology used herein is for the purpose of describing particular embodiments only and is not intended to be limiting of the invention.

The headings (such as "Background" and "Summary") and sub-headings used herein are intended only for general organization of topics within the present invention, and are not intended to limit the disclosure of the present invention or any aspect thereof. In particular, subject matter disclosed in the "Background" may include novel technology and may not constitute a recitation of prior art. Subject matter disclosed in the "Summary" is not an exhaustive or complete disclosure of the entire scope of the technology or any embodiments thereof. Classification or discussion of a material within a section of this specification as having a particular utility is made for convenience, and no inference should be drawn that the material must necessarily or solely function in accordance with its classification herein when it is used in any given composition.

As used herein, the singular forms "a", "an" and "the" are intended to include the plural forms as well, unless the context clearly indicates otherwise.

It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

As used herein, the term "and/or" includes any and all combinations of one or more of the associated listed items and may be abbreviated as "/".

Links are disabled by deletion of http: or by insertion of a space or underlined space before www. In some instances, the text available via the link on the "last accessed" date may be incorporated by reference.

As used herein in the specification and claims, including as used in the examples and unless otherwise expressly specified, all numbers may be read as if prefaced by the word "substantially", "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), +/−15% of the stated value (or range of values), +/−20% of the stated value (or range of values), etc. Any numerical range recited herein is intended to include all sub-ranges subsumed therein.

Disclosure of values and ranges of values for specific parameters (such as temperatures, molecular weights, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10 it also describes subranges for Parameter X including 1-9, 1-8, 1-7, 2-9, 2-8, 2-7, 3-9, 3-8, 3-7, 2-8, 3-7, 4-6, or 7-10, 8-10 or 9-10 as mere examples. A range encompasses its endpoints as well as values inside of an endpoint, for example, the range 0-5 includes 0, >0, 1, 2, 3, 4, <5 and 5.

As used herein, the words "preferred" and "preferably" refer to embodiments of the technology that afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the technology.

As referred to herein, all compositional percentages are by weight of the total composition, unless otherwise specified. As used herein, the word "include," and its variants, is intended to be non-limiting, such that recitation of items in a list is not to the exclusion of other like items that may also be useful in the materials, compositions, devices, and methods of this technology. Similarly, the terms "can" and "may" and their variants are intended to be non-limiting, such that recitation that an embodiment can or may comprise certain elements or features does not exclude other embodiments of the present invention that do not contain those elements or features.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

Spatially relative terms, such as "under", "below", "lower", "over", "upper", "in front of" or "behind" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

The description and specific examples, while indicating embodiments of the technology, are intended for purposes of illustration only and are not intended to limit the scope of the technology. Moreover, recitation of multiple embodiments having stated features is not intended to exclude other embodiments having additional features, or other embodiments incorporating different combinations of the stated features. Specific examples are provided for illustrative purposes of how to make and use the compositions and methods of this technology and, unless explicitly stated otherwise, are not intended to be a representation that given embodiments of this technology have, or have not, been made or tested.

All publications and patent applications mentioned in this specification are herein incorporated by reference in their entirety to the same extent as if each individual publication or patent application was specifically and individually indicated to be incorporated by reference, especially referenced is disclosure appearing in the same sentence, paragraph, page or section of the specification in which the incorporation by reference appears.

The citation of references herein does not constitute an admission that those references are prior art or have any relevance to the patentability of the technology disclosed herein. Any discussion of the content of references cited is intended merely to provide a general summary of assertions made by the authors of the references, and does not constitute an admission as to the accuracy of the content of such references.

The invention claimed is:

1. An adsorbent bag for water purification, comprising:
a porous membrane containing at least one solid adsorbent consisting of particles of multiwalled carbon nanotubes (MWCNT) and graphene;
wherein the porous membrane is made from a polypropylene membrane having an average pore size of from 0.08 to 0.12 μm and a thickness of from 80 to 120 μm, and wherein the at least one solid adsorbent is sealed inside of the porous membrane;

wherein the porous membrane is in the form of a bag having an interior sealed pouch space containing the at least one solid adsorbent;

wherein the multiwalled carbon nanotubes have an outside diameter of from 10 to 20 nm and an average length of from 1 to 10 µm; and a string connected to the polypropylene membrane so that the porous membrane containing the at least one solid adsorbent is immersable.

2. The adsorbent bag of claim 1, having a square or rectangular profile with sides no more than 6 cm long.

3. The adsorbent bag of claim 1, having a square or rectangular profile with sides no more than 2 cm long.

4. The adsorbent bag of claim 1, wherein the at least one solid adsorbent is a 1:1 mixture of MWCNTs and graphene.

5. A method for removing a polyaromatic hydrocarbon from water, comprising:

immersing the adsorbent bag of claim 1 in the water for a time sufficient for binding of the polyaromatic hydrocarbon to the at least one solid adsorbent and then separating the adsorbent bag from the water.

6. The method of claim 5, wherein the polyaromatic hydrocarbon is fluorene.

7. The method of claim 5, wherein the polyaromatic hydrocarbon is anthracene.

8. The method of claim 5, further comprising, before the immersing, sonicating the adsorbent bag in ethanol.

\* \* \* \* \*